US005530795A

United States Patent [19]

Wan

[11] Patent Number: 5,530,795

[45] Date of Patent: Jun. 25, 1996

[54] COMPUTER CONFERENCING

[76] Inventor: Hong K. Wan, 111 Bukit Batok West Ave 6, #21-134, Singapore 2365, Singapore

[21] Appl. No.: 196,514

[22] Filed: Feb. 15, 1994

[51] Int. Cl.[6] ........ G06T 1/00

[52] U.S. Cl. ........ 395/153; 395/158; 395/200.04

[58] Field of Search ........ 395/153, 157–158, 395/161, 146, 200, 200.02, 200.04, 200.1; 345/1–3

[56] References Cited

U.S. PATENT DOCUMENTS

| | | | |
|---|---|---|---|
| Re. 34,476 | 12/1993 | Norwood | 382/13 |
| 4,646,250 | 2/1987 | Childress | 395/149 |
| 5,157,763 | 10/1992 | Peters et al. | 395/157 |
| 5,220,657 | 6/1993 | Bly et al. | 395/425 |
| 5,339,389 | 8/1994 | Bates et al. | 395/153 |
| 5,408,600 | 4/1995 | Garfinkel et al. | 395/153 |

*Primary Examiner*—Mark K. Zimmerman
*Assistant Examiner*—Joseph H. Feild
*Attorney, Agent, or Firm*—Klarquist Sparkman Campbell Leigh & Whinston

[57] ABSTRACT

Information is communicated between computer users having display units by displaying a common software application and generating a transparent display window over the common software application. A data communication link is established between the users and a common display of a subject software application that can receive input via the communication link appears on each display unit. An overlay software application is activated to generate a transparent display window positioned over the common application on each display unit, after which the common application remains visible. Inputs made are displayed on

9 Claims, 2 Drawing Sheets

5

8

6

7

COMPUTER CONFERENCING

BACKGROUND OF THE INVENTION

1. Field of the Invention

The subject of the invention generally relates to a method of communicating information between a plurality of computer users and more particularly to a method of communicating information between a plurality of computer users concerning an active software application without providing an input to the active software application.

2. Description of the Prior Art

Graphical user interface software applications are well known and include applications such as WINDOWS (Trademark) published by Microsoft Corporation. Computers having resident software applications such as WINDOWS (Trademark) can be networked together to facilitate a free exchange of information between the users of the computers. If two computer users wish to discuss, for example, a particular document in a word processing application or a set of data in a spreadsheet application then any amendments made to the document or spreadsheet by the user results in amendment of the document or spreadsheet. This is disadvantageous as the document or spreadsheet cannot be annotated by one user and the annotations used by another user without amending the document or spreadsheets.

It is therefore an object of the present invention to provide a method of communicating information between a plurality of computer users to enable a free exchange of information concerning a subject computer application without amending either the software application or a document or the like being displayed by that application.

Accordingly, the present invention provides a method of communicating information between the plurality of computer users comprising the steps of: establishing a data communications link between the users; providing each user with a common display of a subject software application on a visual display unit, which application is susceptible to data input from at least one of the users via the data communications link; activating an overlay application to generate a transparent display on the visual display unit of at least one user; and positioning the transparent display over at least a part of the common display, the common display remaining visible to the or each user, in which method an input made by the or each user having the transparent display over the common display of the subject application is displayed on the transparent display of the users and is not perceived as an input by the subject application.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF A PREFERRED EMBODIMENT OF THE INVENTION

Figure 1:
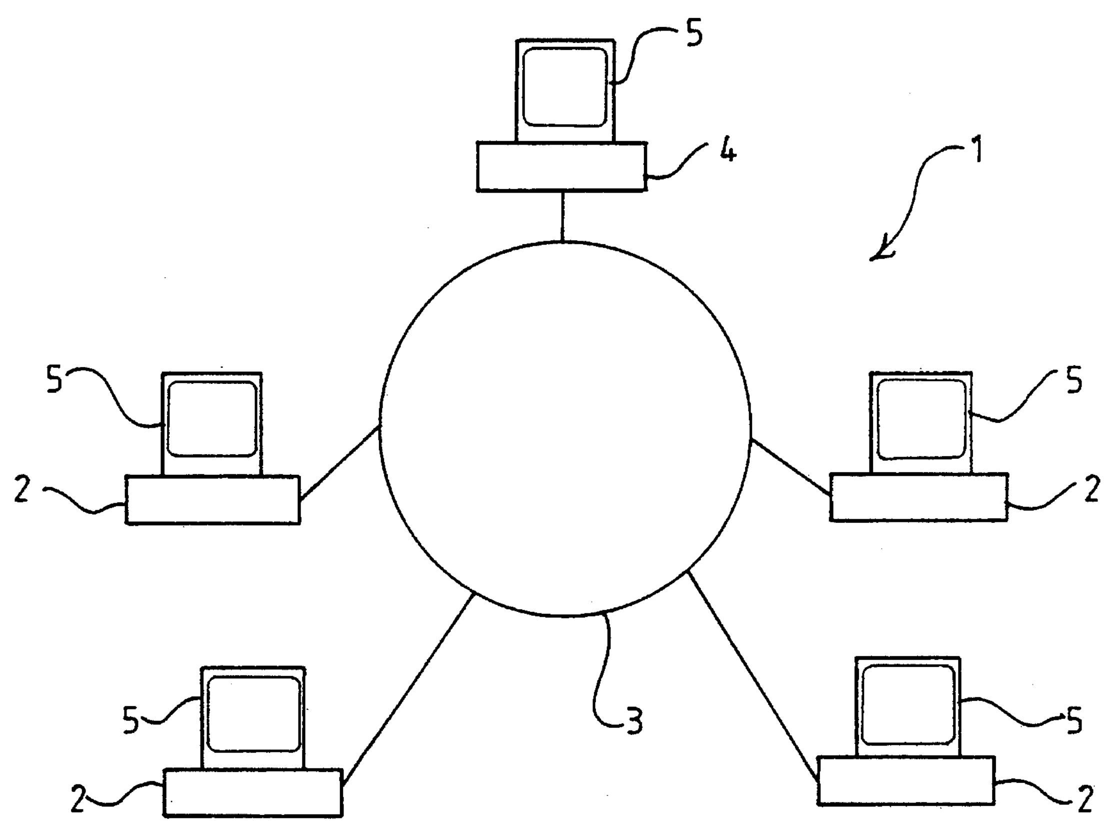
FIG. 1 is a schematic representation of a communication network employing a method of communicating information embodying the present invention.

FIG. 1 shows a local area network 1 comprising a plurality of personal computers 2 in data communication with a main bus loop 3 for carrying data and control information. One or more of the computers 2 has a control program resident in a data storage area. The control program is opened by one of the operators and establishes that originating computer 2 as the control computer 4. When opened, the control program prompts the operator to select a particular subject software application to be discussed by the users of the other computers 2 in the network 1. The subject application on computer 4 is selected and opened by the control program. The control program establishes data communication between all the computers 2, 4 in the network 1 and the control programs of the other computers 2 are also opened. The video output of the subject application is then displayed on the video display unit 5 of each of the computers 2, 4.

Having established data communications between all the computers 2, 4 and displayed the output of the subject application on each of the computers 2, 4, the output of the subject application may now be discussed by the operators of the computers 2, 4. Any one of the operators of the computers 2, 4 can make amendments to the document or spreadsheet displayed by the subject application as if that application was resident in their own computer. The results of the amendments made by any one operator of a computer 2, 4 in the network are shown on the visual display unit 5 of each of the other computers 2, 4. Thus, each of the operators has the ability to amend the particular document or spreadsheet being displayed by the subject application shown by the control computer 4.

In the preferred embodiment of the present invention only the control computer 4 actually runs the subject application and the output of the application is channelled to the other computers 2 via the network 1. The output is displayed on each of the visual display units 5 of the computers 2, 4. Inputs from the computers 2 can also be channelled to the control computer 4 via network 1 to amend the output of the subject application displayed by computer 4. Any operator on the network 1 can activate a so-called transparency application which is part of the control program. By activating the transparency application, a portion of the screen of each of the computers 2, 4 is overlaid with a transparent portion which is automatically positioned to cover the output display of the subject application. Alternatively, the transparent portion is manoeuvrable around the screen and is positioned over the output display by a mouse, keyboard or other positioning means. Any amendment subsequently made by any of the operators on the network 1 will be shown on the transparent portion and communicated to each of the other operators on the network. However, the amendments are not transmitted to the subject application and do not alter the output of the subject application, they merely appear on the transparent portion of the screen.

Figure 2:
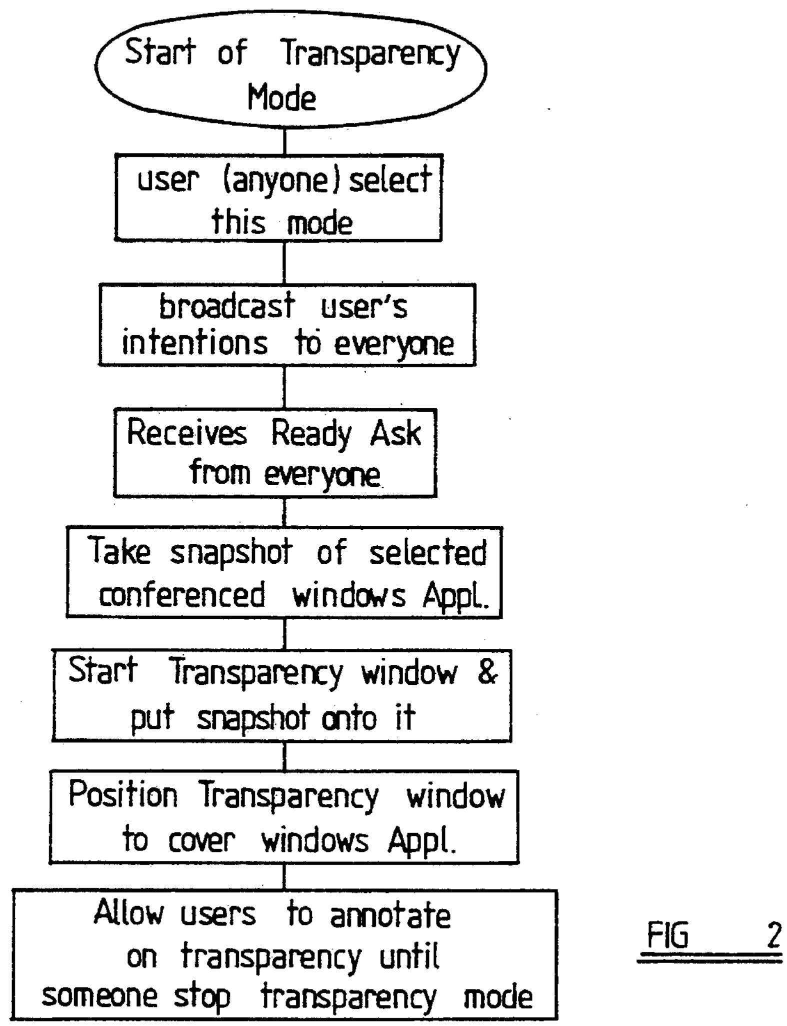
FIG. 2 is a flow chart showing the operational steps taken in accordance with one embodiment of the present invention.

As shown in FIG. 2, the operation of a preferred embodiment of the present invention is illustrated with reference to a flow chart of a WINDOWS (Trademark) application being run as the subject application. Firstly, the transparency mode within the control program is initiated by one of the operators on the network 1. This decision is communicated to each of the other computers 2, 4 which are thereby placed in the transparency mode. The operator activating the transparency mode need not be the operator starting the subject application, in this case, control computer 4. When the transparency mode has been activated in all of the computers 2, 4, an acknowledgement is sent back to the originating computer from all of the other computers 2 on the network 1.

Figure 3:
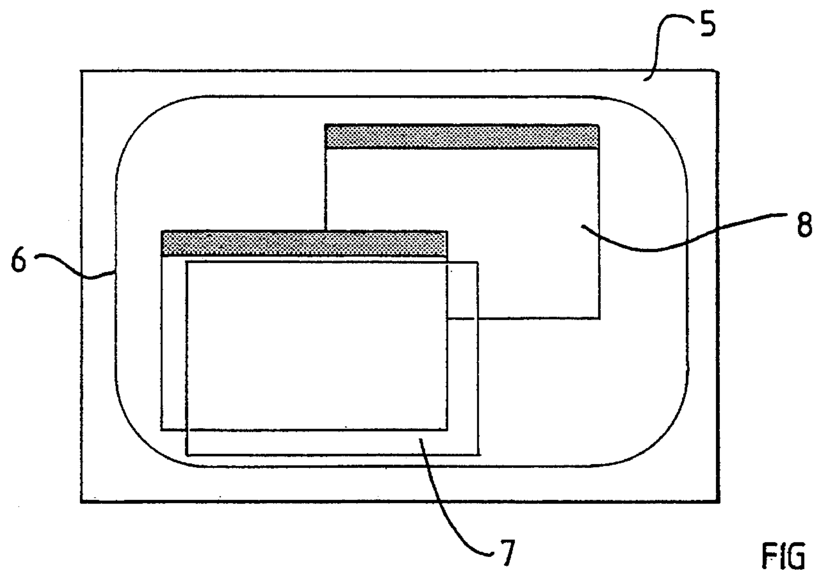
FIG. 3 is a schematic illustration of a transparent window overlaying a window of a subject application.

Referring to FIG. 3, the transparency application then takes a snapshot image of the WINDOWS (Trademark)

application which has been selected to be discussed by the operator 4 on the network 1. The snapshot image of the output of subject application 6 is then copied into the transparent portion 7 created by the transparency application. The transparent window 7 is then moved and resized preferably automatically to cover the application window 6 exactly. This provides the user with a transparent window covering the application window to be discussed. A second WINDOWS application 8 is shown in the background which is not active. Amendment of the transparent window 7 is permitted, which amendment is made to the transparent window 7 which contains the snapshot of 6 as opposed to the WINDOWS subject application 6 such that the WINDOWS application does not perceive the amendments being made to the transparent window 7 as an input to the WINDOWS application. The amendments to the transparent window are provided to all of the operators for discussion. The amendments may be made simultaneously by many operators. When the amendments have been discussed by the operators on the network 1, any one of the operators can terminate the transparency application thereby removing the transparent window 7 such that any further amendment is perceived as an input to the subject application.

In one embodiment of the present invention, amendments made upon the transparent window 7 are supplied as an input to the subject application once the transparency application has been terminated to effect the amendments in the subject application.

In the preferred embodiment of the present invention, the subject application is a WINDOWS application and the transparent window can be applied to a single window shown on the visual display unit 5 as opposed to the entire screen of the visual display unit 5.

The network 1 may be an Integrated Services Digital Network (ISDN) or an analog phone line network.

What is claimed is:

1. A method of communicating information between a plurality of computer users each having visual display units comprising the steps of:

establishing a data communications link between a first set of the users;

generating a common display of a subject software application on the visual display unit of each user in the first set, the subject software application receiving data input from a second set of users comprised of at least one of the users in the first set of users via the data communications link;

activating an overlay software application to generate a transparent display window on the visual display unit of each of the second set of users; and positioning the transparent display window over at least a part of the common display, the common display remaining visible to the second set of users, wherein an input made by a user of the second set of users having the transparent display window over the common display of the subject software application is displayed on the transparent display window of each of the second set of users and is not implemented as an input by the subject software application.

2. A method according to claim 1, wherein the inputs displayed on the transparent display window are effected as inputs in the subject application in response to a signal for terminating the overlay application.

3. A method according to claim 1, wherein the inputs displayed on the transparent display window are effected as inputs in the subject application upon demand by a user.

4. A method according to claim 1, wherein the subject application is an active application.

5. A method according to claim 1, wherein the subject application is a graphical user interface application.

6. A method according to claim 1, wherein the common display of the subject application comprises one of a plurality of displays of graphical user interface applications.

7. An apparatus for communicating information comprising:

a communication link between a first set of a plurality of computers;

a plurality of visual display units each linked to a computer in the first set, wherein the visual display units are for displaying a common display of a subject software application receiving data input from a second set of computers comprised of at least one of the first set of computers via the communication link, the visual display unit of the second set of computers comprised of at least one computer from the first set of computers displaying a transparent display window upon activation of an overlay software application;

and positioning means for positioning the transparent display window over at least a part of the common display, the common display remaining visible on the second set of computers, wherein an input from one of the computers of the second set of computers displaying the transparent display window over the common display of the subject software application is displayed on the transparent display window of each of the second set of computers and is not implemented as an input by the subject software application.

8. An apparatus according to claim 7, wherein the plurality of computers and the communication link are components of a local area network.

9. An apparatus according to claim 7, wherein the plurality of computers and the communication link are components of a wide area network.

* * * * *

UNITED STATES PATENT AND TRADEMARK OFFICE
CERTIFICATE OF CORRECTION

PATENT NO. : 5,530,795

DATED : June 25, 1996

INVENTOR(S) : Hong Khoon Wan

It is certified that error appears in the above-identified patent and that said Letters Patent is hereby corrected as shown below:

In the cover page, in the ABSTRACT, after the last sentence shown, please add remainder of text as follows:

--the transparent display window but not implemented by the subject software application. Subsequently, the inputs can be implemented by the subject software application upon termination of the overlay software application or upon user demand.--

Signed and Sealed this

Third Day of December, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,530,795

DATED : June 25, 1996

INVENTOR(S) : Hong Khoon Wan

It is certified that error appears in the above-indentified patent and that said Letters Patent is hereby corrected as shown below:

Title page, item [73], Assignee: should read--Mediacom Technologies, PTE, Limited--.

Signed and Sealed this

Eleventh Day of February, 1997

Attest:

BRUCE LEHMAN

Attesting Officer

Commissioner of Patents and Trademarks